United States Patent [19]

Okonek et al.

[11] Patent Number: 5,381,815
[45] Date of Patent: Jan. 17, 1995

[54] METHOD FOR ISOLATING A RELIEF VALVE

[75] Inventors: Leslie J. Okonek, Bellingham, Wash.; John W. Wegner, Montebello, Calif.

[73] Assignees: Atlantic Richfield Company, Los Angeles; Koppl Company Incorporated, Montebello, both of Calif.

[21] Appl. No.: 48,089

[22] Filed: Apr. 15, 1993

[51] Int. Cl.6 ............................................. F16K 43/00
[52] U.S. Cl. ..................... 137/15; 137/315; 137/317; 138/89; 138/94; 138/97
[58] Field of Search ............... 137/15, 315, 318, 317, 137/587, 588, 589; 138/89, 94, 94.3, 97

[56] References Cited

U.S. PATENT DOCUMENTS

| | | | |
|---|---|---|---|
| 463,524 | 11/1891 | Madden | 137/318 |
| 2,654,563 | 10/1953 | Mueller et al. | 137/315 |
| 2,988,111 | 6/1961 | Ver Nooy | 138/89 |
| 3,533,424 | 10/1970 | Wedge | 137/15 |
| 3,598,154 | 8/1971 | Brundage | 138/94.3 |
| 3,891,146 | 6/1975 | Blazek | 138/94.3 |
| 3,908,691 | 9/1975 | Coughlin | 137/315 |
| 3,948,282 | 4/1976 | Yano | 137/15 |
| 4,141,378 | 2/1979 | Wegner et al. | 137/315 |
| 4,408,636 | 10/1983 | Karpenko | 138/89 |
| 4,431,017 | 2/1984 | Willemsen | 137/15 |
| 4,513,788 | 4/1985 | Coker et al. | 138/89 |
| 4,719,936 | 1/1988 | Tsubakimoto et al. | 137/15 |

Primary Examiner—George L. Walton

[57] ABSTRACT

A method for isolating a relief valve, the relief valve being positioned in fluid communication with a pressurized vessel by positioning a gate valve body between and in fluid communication with the relief valve and the pressurized vessel, the gate valve body including a plug and a cap positioned to sealingly close an opening in the gate valve body generally covered by a gate valve bonnet cover and yoke, removing the cap, sealingly positioning a sandwich valve over the opening in the gate valve so that when the pass-through is opened a passageway through the pass-through sandwich valve is generally co-axial with the opening in the gate valve, sealingly positioning a removable yoke over the passageway through the pass-through, the removable yoke including a stem and being adapted to movement of the stem through the removable yoke; opening the pass-through; moving the stem into engagement with the plug and removing the plug from the opening in the gate valve body; and positioning a valve gate on the stem and moving the valve gate into closing engagement with valve seats positioned in the gate valve body to isolate the relief valve.

8 Claims, 4 Drawing Sheets

METHOD FOR ISOLATING A RELIEF VALVE

BACKGROUND OF THE INVENTION

1. Field of the Invention

This invention relates to a method for isolating a relief valve by the use of special equipment which limits the ability of operating personnel to isolate the relief valve unless the special equipment is available.

2. Background

Relief valves are widely used to control pressure build-ups in pressurized vessels, pressurized operating units (herein referred to as vessels) and the like. Such relief valves are typically set to open when a predetermined pressure is exceeded to vent material contained in the vessel to prevent pressures beyond the preset level in the vessel. In some instances, conditions may exist which cause a relief valve to open frequently. In some instances, such valves are not self resetting and operating personnel may be required to climb to the top of a vessel or the like to reset the relief valve. When the relief valve is activated frequently, it is not uncommon for operating personnel to conclude that the relief valve should be closed. If a valve is available in the line from the pressurized vessel to the relief valve the valve may be closed to prevent the frequent trips necessary to reset the relief valve. Such a practice obviously results in a safety risk since the pressurized vessel no longer has a pressure relief. Such practices are discouraged but are occasionally found to have occurred.

Accordingly, a continuing search has been directed to the development of a method for isolating a relief valve which will permit the isolation of the relief valve for maintenance and the like while limiting the ability of operating personnel to isolate the relief valve for other purposes.

SUMMARY OF THE INVENTION

A relief valve positioned in fluid communication with a pressurized vessel is readily isolated for desired purposes by a method consisting essentially of: positioning a modified gate valve body between and in fluid communication with the relief valve and the pressurized vessel, the modified gate valve body including a plug and a cap positioned to sealingly close the opening in the modified gate valve body generally covered by a bonnet cover and yoke, removing the cap, sealingly positioning a pass-through over the opening in the modified gate valve body so that when the pass-through is opened a passageway through the pass-through is generally co-axial with the opening in the modified gate valve body, sealingly positioning a removable yoke over the passageway through the pass-through, the removable yoke including a stem and being adapted to movement of the stem through the removable yoke; opening the pass-through; moving the stem into engagement with the plug and removing the plug from the opening in the modified gate valve body; and positioning a valve gate on the stem and moving the valve gate into valve closing engagement with valve seats positioned in the modified gate valve body to isolate the relief valve.

DESCRIPTION OF A PREFERRED EMBODIMENT

In the description of the Figures, the same numbers will be used throughout to refer to the same or similar components.

Figure 1:
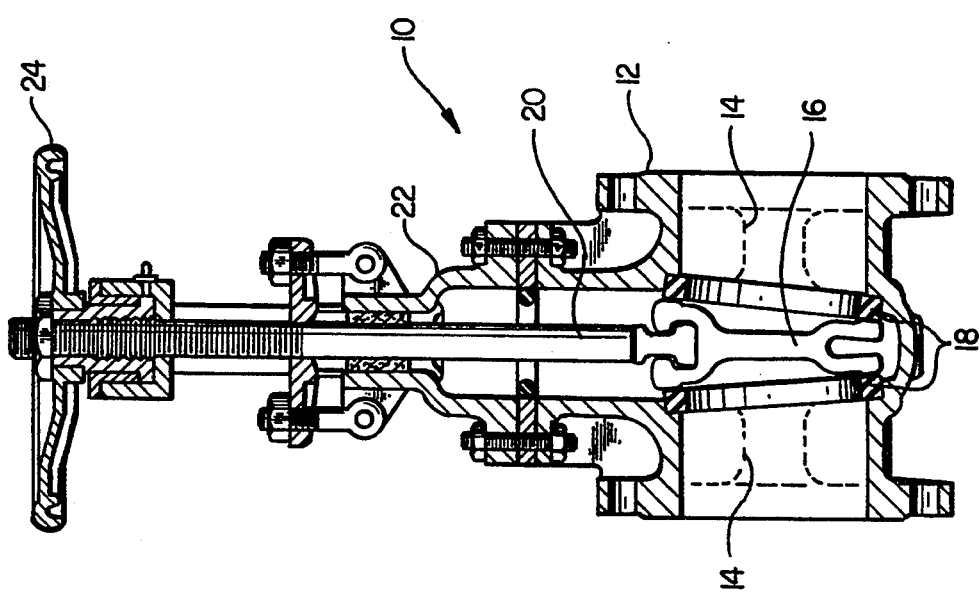
FIG. 1 is a schematic drawing of a closed prior art gate valve.

In FIG. 1, a prior art gate valve 10 is shown. Gate valve 10 comprises a valve body 12 which includes a passageway 14 therethrough for the flow of fluid as well known to those skilled in the art. Valve 10 functions by the movement of a valve gate 16 into and out of sealing engagement with valve seats 18 to permit or prevent the flow of fluids through passageway 14. Valve gate 16 is moved into and out of sealing engagement with valve seats 18 by a stem 20 which is supported in a bonnet cover and yoke 22. Stem 20 is moved upwardly and downwardly in FIG. 1 by threaded connections in bonnet cover and yoke 22 by rotation of a handle 24 although stem 20 could alternatively be moved electrically or hydraulically. Gate valves of this type are considered to be well known to those skilled in the art and no further discussion is deemed necessary.

Figure 2:
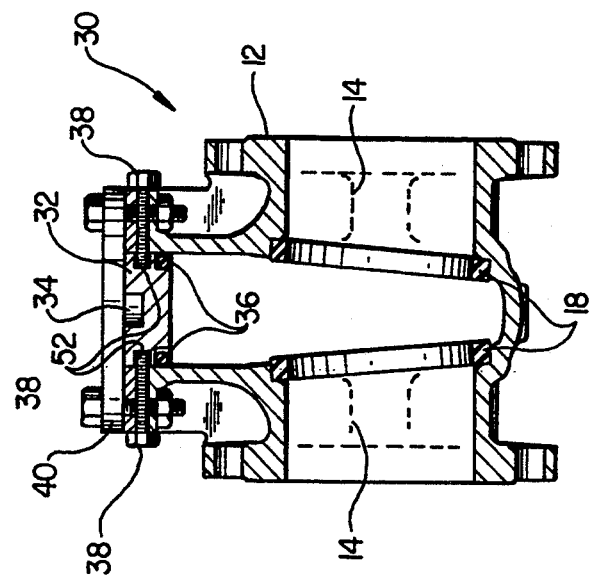
FIG. 2 is a schematic diagram of a modified gate valve body useful in the method of the present invention.

In FIG. 2, a modified gate valve body 30 is shown. Valve gate 16, stem 20 and bonnet cover and yoke 22 have been removed and replaced by a plug 32 which is sealingly positioned in the opening in gate valve body 12 remaining when bonnet cover and yoke 22 are removed. Plug 32 is maintained in position by retainers 38 which may comprise screws, bolts, spring-loaded pins or the like positioned through a portion of valve body 12 to engage receptacles 52 shown generally as a recessed ring around plug 32 which is engaged by retainers 38. Such methods for retaining a plug in a cavity are considered to be known to those skilled in the art and a variety of such retainers could be used. Plug 32 also desirably includes seals 36 so that plug 32 is sealingly positioned in the opening in valve body 12. To further maintain plug 32 in position, a cap 40 is desirably placed over the opening in valve body 12 where bonnet cover and yoke 22 were previously positioned. Cap 40 is normally bolted or otherwise restrained in position and may include seals (not shown) to seal between cap 40 and valve body 12. The net result is that the opening in valve body 12 is sealingly closed. Modified gate valve body 30, as described above, is positioned in a line 62 which fluidly communicates a pressurized vessel 64 and a relief valve 60. Relief valve 60 is a conventional relief valve and will not be discussed further. As described in connection with FIG. 2, modified gate valve body 30 permits fluid communication between pressurized vessel 64 and pressure relief valve 60. Without additional equipment operating personnel cannot conveniently isolate relief valve 60. The net effect is that operating personnel cannot remove relief valve 60 from service without specialized equipment.

Optionally, modified gate valve body 30 may include a control valve 42. Control valve 42 comprises a line 44, including a valve 46, in fluid communication between passageway 14 and control valve 42 and a line 50 including a valve 48 in fluid communication with line 44. Control valve 42 enables the determination of the pressure in passageway 14. Line 50 permits bleeding of line 44 if necessary to clear line 44.

Figure 4:
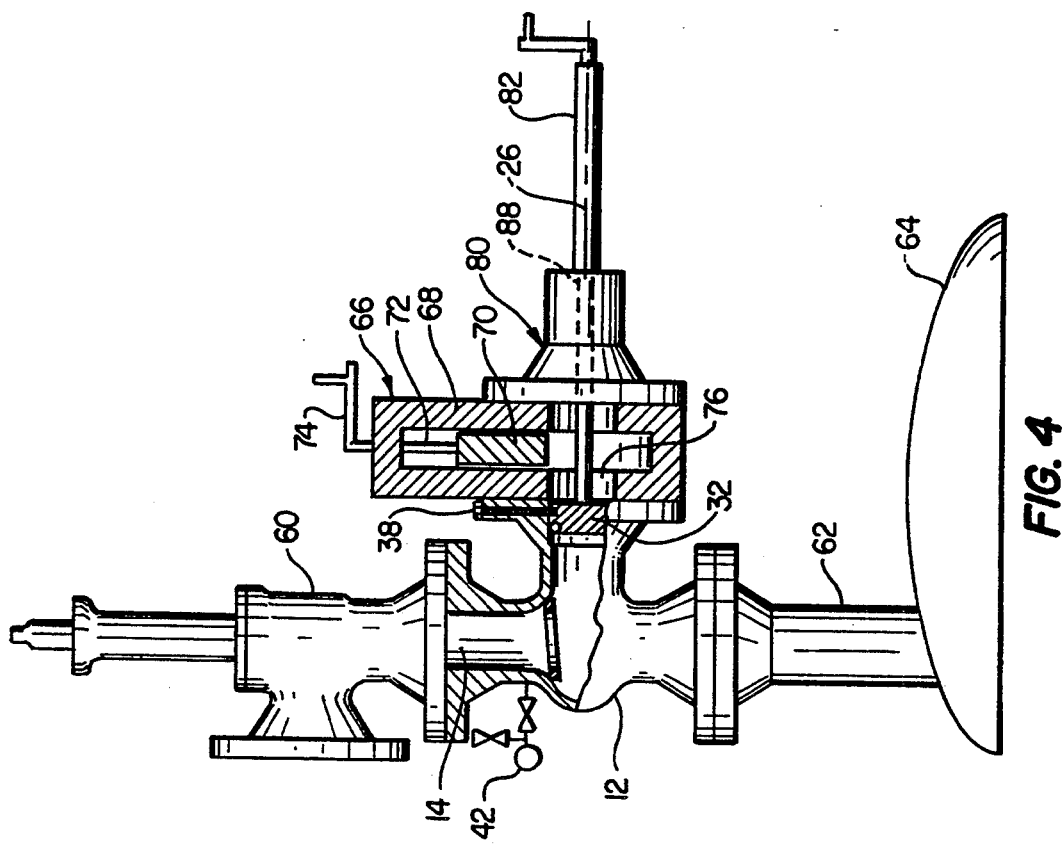
FIG. 4 is a schematic diagram of equipment positioned for performance of a step in the method of the present invention.
Figure 3:
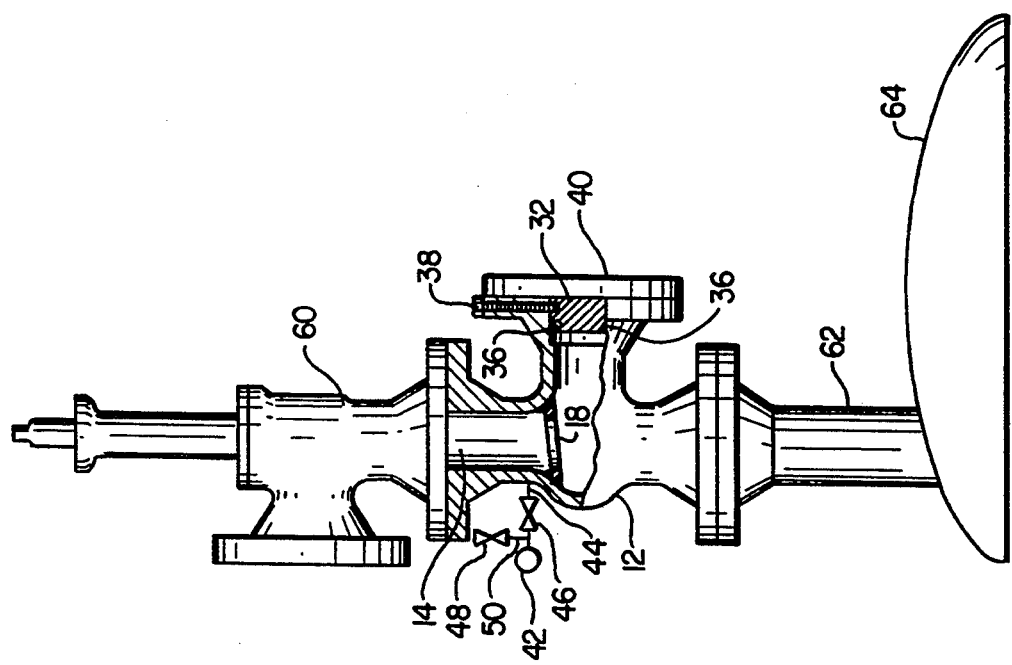
FIG. 3 is a schematic diagram of a relief valve installation according to the method of the present invention.

In FIG. 4, cap 40 has been removed and a sandwich valve 66 comprising a pass-through valve body 68 sealingly positioned over the opening in modified gate valve body 30. A fluid passageway 76 through pass-through body 68 is generally co-axial (axis 26) with the opening in valve body 12. Pass-through valve 66 is readily opened by use of a handle 74 via a stem 72 to pull a gate 70 into or out closing engagement with seats in pass-through body 68. Stem 72 extends from handle 74 to gate 70 and includes equipment such as threading or the like to enable movement of gate 70 into and out of a closed position in a pass-through body 68 by the use of handle 74. It should be understood that, while not shown, hydraulic or electrically activated apparatus may also be used to achieve opening or closing of gate 70.

After sandwich valve 66 is in place, a removable yoke 80 is sealingly positioned over fluid passageway 76 in pass-through 66. Removable yoke 80 includes a handle 82 for moving a stem 88 through removable yoke 80. Stem 88 may also be driven or rotated hydraulically or electrically.

Figure 6:
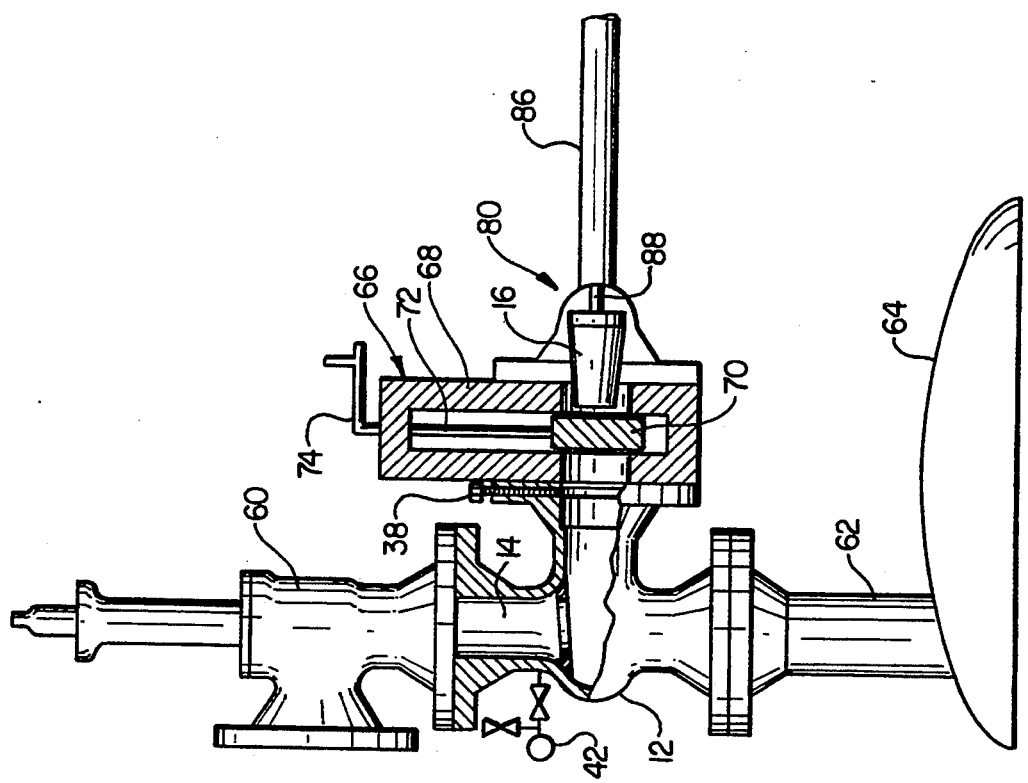
FIG. 6 is a schematic diagram of equipment positioned for performance of a further step of the method of the present invention.
Figure 7:
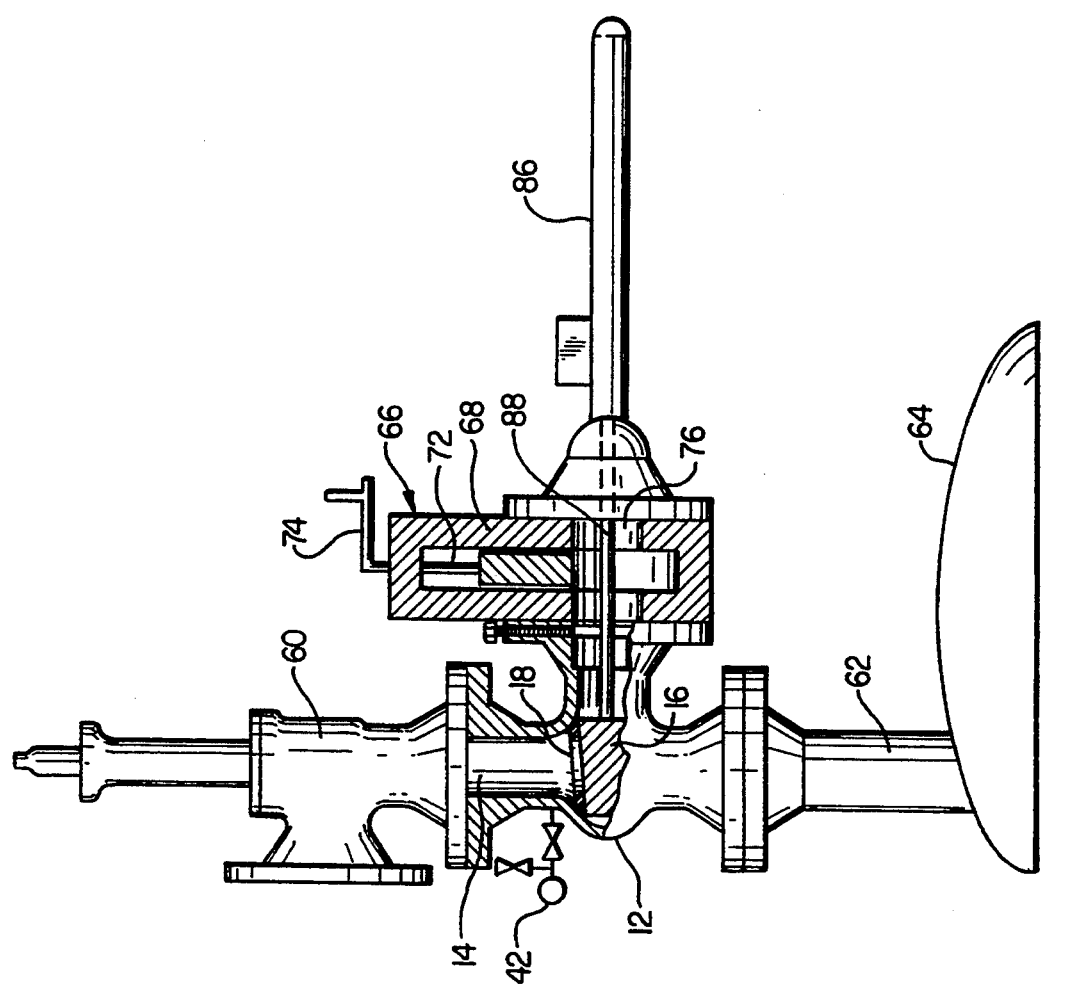
FIG. 7 is a schematic diagram of equipment positioned for performance of a further step of the method of the present invention.

In the practice of the present invention, stem 88 is moved into engagement with a receptacle 34 (shown in FIG. 2) in plug 32 to engage plug 32. Retainers 38 are disengaged and plug 32 is withdrawn from valve body 12 by withdrawing stem 88. Withdrawn plug 32 is shown in its withdrawn position in FIG. 5. After plug 32 has been withdrawn, gate 70 is moved into a closed position in pass-through 66 and removable yoke 80 is removed. Plug 32 is then removed from stem 88 and replaced by valve gate 16, as shown in FIG. 6. Removable yoke 80 is then repositioned over the opening in pass-through 66 and pass-through 66 is opened. Gate 16 is then passed into closing engagement with valve seats 18 in modified gate valve body 30, as shown in FIG. 7. In FIGS. 6 and 7 handle 82 has been replaced by a hydraulic control 86 for rotating and moving stem 88. With gate 16 in closing engagement with seats 18 in modified gate valve body 30, relief valve 60 is isolated from vessel 64 and can be serviced, removed, replaced or the like.

Figure 5:
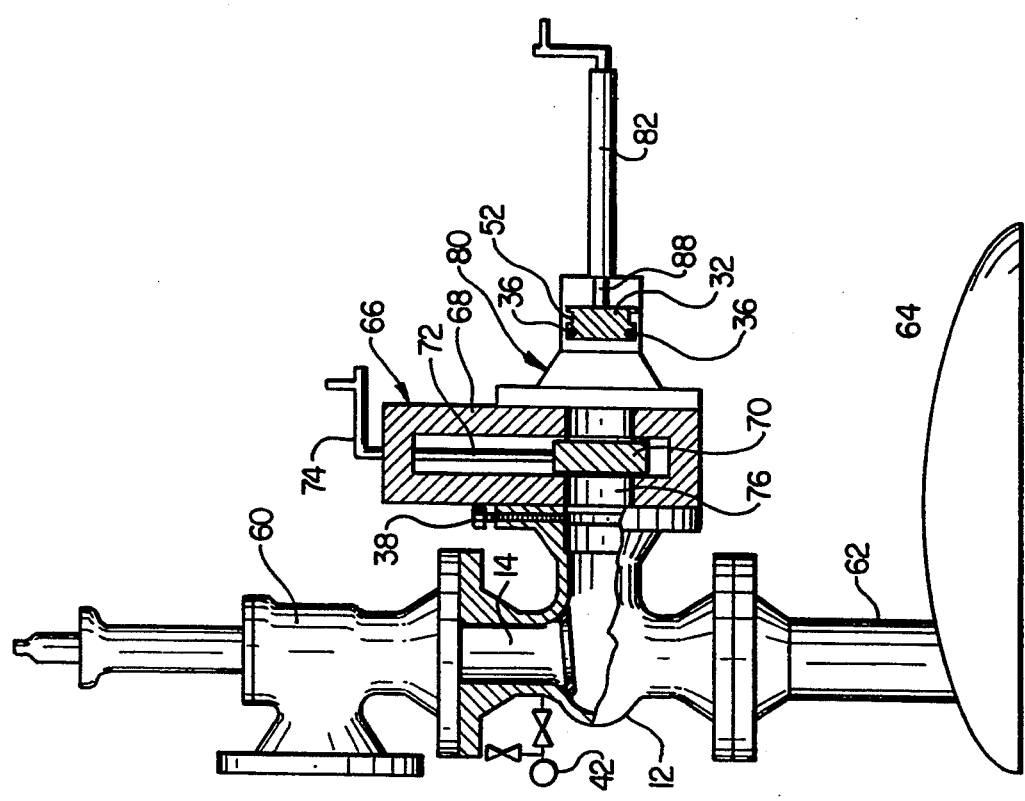
FIG. 5 is a schematic diagram of equipment positioned for performance of another step of the present invention.

When it is desired to return relief valve 60 to service, gate 16 is withdrawn by stem 88 to the position shown in FIG. 6, pass-through 66 is closed and removable yoke 80 is removed. Gate 16 is then removed from stem 88 and replaced by plug 32. Removable yoke 80 is then replaced over the passageway 76 in pass-through 66, as shown in FIG. 5, and plug 32 is returned to the position shown in FIG. 4 and is secured by retainers 38. Removable yoke 80 and pass-through 66 are then removed and cap 40 is replaced. Relief valve 60 is now in service and access is limited to those who have pass-through 66 and removable yoke 80.

According to the present invention, more reliable service from relief valves is obtained since it is insured that such relief valves will remain in service even though it is necessary to have a valve or the like in the line between the relief valve and the pressurized vessel. By the present invention, the relief valve 60 can be isolated for maintenance while limiting the ability to isolate relief valve 60 by operating personnel. The present invention also achieves isolation of relief valve 60 without permitting the escape of material from vessel 64 or passageway 14 through valve body 12 into the atmosphere.

The equipment used in the practice of the present invention is fabricated of materials suitable for contact with the materials contained in vessel 64 and of a strength suitable for the pressures involved. Such variations are considered to be well known to those skilled in the art since the component parts of the specialized equipment necessary to isolate relief valve 60 are modified components of commercially available equipment.

Having thus described the present invention by reference to certain of its preferred embodiments, it is respectfully pointed out that such embodiments are illustrative rather than limiting in nature and that many variations and modifications are possible within the scope of the present invention. Many such variations and modifications may be considered obvious and desirable by those skilled in the art based upon the foregoing description of preferred embodiments.

Having thus described the invention, we claim:

1. A method for isolating a relief valve, said relief valve being positioned in fluid communication with a pressurized vessel to open when a pre-set pressure condition in said pressurized vessel is exceeded to release said pressure within said pressurized vessel, said method consisting essentially of:

a) positioning a gate valve body between and in fluid communication with said relief valve and said pressurized vessel, said gate valve body including a plug and a cap positioned to sealingly close an opening in said gate valve body generally covered by a gate valve bonnet cover and yoke;

b) removing said cap;

c) sealingly positioning a pass-through valve over said opening in said gate valve so that when said pass-through valve is opened, a passageway through said pass-through valve is generally co-axial with said opening in said gate valve;

d) sealingly positioning a removable yoke over said passageway through said pass-through valve, said removable yoke including a stem and being adapted to movement of said stem through said removable yoke;

e) opening said pass-through valve;

f) moving said stem into engagement with said plug and removing said plug from said opening in said gate valve body; and g) positioning a valve gate on said stem and moving said valve gate into closing engagement with valve seats positioned in said gate valve body to isolate said relief valve to thereby permit access to said relief valve when said relief valve is not in service.

2. The method of claim 1 wherein said plug is retained in position in said opening in said gate valve by retainers positioned to engage said plug through a portion of said gate valve body.

3. The method of claim 1 wherein said stem is mechanically moved through said removable yoke.

4. The method of claim 1 wherein said stem is hydraulically moved through said removable yoke.

5. The method of claim 1 wherein said stem is electrically moved through said removable yoke.

6. The method of claim 1 wherein said pass-through valve is closed after step f), said removable yoke is removed from said pass-through valve to remove said plug from said stem and position said valve gate on said stem, said removable yoke is repositioned on said pass-through valve and said pass-through valve is opened.

7. The method of claim 1 wherein said relief valve is returned to service by:
   h) removing said valve gate from closing engagement with said valve seats positioned in said gate valve body;
   i) removing said valve gate from said stem and positioning said plug on said stem;
   j) sealingly positioning said plug in said opening in said gate valve body and removing said stem;
   k) removing said pass-through valve; and
   l) positioning said cap over said opening in said gate valve body.

8. The method of claim 7 wherein said pass-through valve is closed after step h), said removable yoke is removed from said pass-through valve to remove said valve gate from said stem and position said plug on said stem, said removable yoke is repositioned on said pass-through valve and said pass-through valve is opened.

* * * * *